United States Patent

Nishida et al.

[11] Patent Number: 5,273,860
[45] Date of Patent: Dec. 28, 1993

[54] INFORMATION RECORDING MEDIUM

[75] Inventors: Tetsuya Nishida, Hachioji; Shinkichi Horigome, Tachikawa; Mari Ichikawa, Higashimurayama; Norio Ohta, Kitasoma; Shuhei Nakamichi, Yuki; Akira Gotoh, Kisarazu, all of Japan

[73] Assignees: Hitachi, Ltd.; Hitachi Maxell Ltd., both of Tokyo, Japan

[21] Appl. No.: 615,914

[22] Filed: Nov. 20, 1993

[30] Foreign Application Priority Data

Nov. 24, 1989 [JP] Japan ................. 1-303257
Feb. 9, 1990 [JP] Japan ................. 2-28511

[51] Int. Cl.$^5$ ................................. G11B 7/24
[52] U.S. Cl. ........................... 430/271; 430/495; 430/945; 346/135.1; 369/288
[58] Field of Search ........... 430/271, 270, 945, 495; 346/135.1; 369/288

[56] References Cited

U.S. PATENT DOCUMENTS

| | | | |
|---|---|---|---|
| 4,286,045 | 8/1981 | Nahara et al. | 430/270 |
| 4,290,075 | 9/1981 | Jacobs et al. | 430/270 |
| 4,296,419 | 10/1981 | Terao et al. | 346/135.1 |
| 4,385,305 | 5/1983 | Terao et al. | 346/135.1 |
| 4,405,706 | 9/1983 | Takahashi et al. | 430/271 |
| 4,434,429 | 2/1984 | Terao et al. | 346/135.1 |
| 4,460,636 | 7/1984 | Watanabe | 428/212 |
| 4,499,178 | 2/1985 | Wada et al. | 430/271 |
| 4,587,533 | 5/1986 | Nakane et al. | 346/135.1 |
| 4,645,712 | 2/1987 | Ishigaki et al. | 428/433 |

FOREIGN PATENT DOCUMENTS

53-141040 12/1978 Japan ................. 346/135.1

OTHER PUBLICATIONS

Chemical Rubber Company "Handbook of Chemistry and Physics" 55th edition 1974-1975, pp. B-66 to B-156.
English Language Abstract of JP 02-040142, Tsuzukiyama, Feb. 1990.

*Primary Examiner*—Charles L. Bowers, Jr.
*Assistant Examiner*—John A. McPherson
*Attorney, Agent, or Firm*—Antonelli, Terry Stout & Kraus

[57] ABSTRACT

Disclosed herein is an information recording medium which is composed of a substrate, underlayer, and recording film and is capable of recording information by means of depressions or pits which are formed on the recording film upon irradiation with a recording energy beam, said information recording medium being characterized in that the recording film is provided with a supporting layer on at least one side of the recording film, said supporting layer having a melting point which is lower than that of the recording film, or on that side of the recording film which is adjacent to the substrate, said supporting layer having a melting point which is higher than that of the recording film. Owing to these features, the information recording medium gives recording pits having a smaller rim inner diameter, so that it achieves a high recording power margin for high-density recording.

3 Claims, 7 Drawing Sheets

INFORMATION RECORDING MEDIUM

BACKGROUND OF THE INVENTION

The present invention relates to an information recording medium which is composed of a substrate, underlayer, and recording film and is capable of recording information by means of depressions or pits which are formed on the recording film upon irradiation with a recording energy beam.

More particularly, the present invention relates to an information recording medium which is capable of recording digital information in a real-time mode by irradiation with a recording energy beam such as laser light and electron beam, said digital information including video and audio signals (formed by FM modulation of analog signals), computer-generated data, facsimile signals, and digital audio signals.

The information recording medium capable of recording information by means of depressions or pits which are formed on the recording film upon irradiation with a recording energy beam, is composed of a substrate, underlayer, and recording film. The substrate is a glass disc or a plastics disc (of acrylic resin or the like) provided with a UV light-cured resin layer in which are formed tracking grooves, or a plastics disc (of polycarbonate, acrylic resin, polyolefin, or the like) having tracking grooves formed by injection molding. The underlayer is made from a solvent-soluble resin (such as nitrocellulose, acetyl cellulose, and copper phthalocyanine) or a sputterable resin (such as fluoroplastics). The recording film is a thin film composed mainly of Te.

It has been a common practice to stabilize the recording film of the information recording medium by providing, on at least one side of the recording film, with a thin film as a supporting layer for recording, which is composed mainly of an element such as Sb, Si, Ge, and Sn. (See Japanese Patent Laid-open No. 224446/1983.)

The above-mentioned recording medium based on the prior art technology has a disadvantage that the depressions or pits (simply referred to as pits hereinafter) which are formed upon irradiation with an energy beam have a small rim width and a large rim inner diameter. (This disadvantage is due to the lack of full attention to the temperature distribution in the part irradiated with an energy beam, the viscosity of the molten recording film, and the wettability of the underlayer by the molten recording film.) Since the signals reproduced by recorded pits are dependent on the rim inner diameter of pits, pits with a smaller rim inner diameter are more suitable for high-density recording than pits with a larger rim inner diameter, even though they are the same in rim outer diameter. This presents a problem associated with the low power margin of recording light (the power region of the recording light which secures the sufficient reproducing signal intensity) when high-density recording is to be made on the conventional recording medium.

SUMMARY OF THE INVENTION

It is an object of the present invention to provide a recording medium which gives a large power margin at the time of recording. This object is achieved by an information recording medium defined in the following.

(1) An information recording medium composed of a substrate and at least a recording film formed thereon, said recording film being capable of forming depressions or pits thereon upon irradiation with a recording energy beam, characterized in that the recording film is provided with a supporting layer composed mainly of at least one element selected from the group consisting of Se and S, on at least one side thereof.

(2) An information recording medium as defined in (1) above, wherein the supporting layer contains at least Se.

(3) An information recording medium as defined in (1) or (2) above, wherein the supporting layer contains at least one additional element selected from the group consisting of Te, Pb, Bi, In, Tl, As, Zn, Ir, Fe, Ru, Os, Mn, Re, V, Ta, Zr, Hf, Sc, Y, Sb, Si, Ge, Sn, Al, Cu, Ag, Au, Ni, Pd, Pt, Co, Rh, Cr, Mo, W, Nb, Ti, and lanthanoid elements, in the form of a mixture containing 1-10 atom % of said element.

(4) An information recording medium as defined in (3) above, wherein the supporting layer contains at least Te as the additional element.

(5) An information recording medium composed of a substrate and at least a recording film formed thereon, said recording film being capable of forming depressions or pits thereon upon irradiation with a recording energy beam, characterized in that the recording film is provided with a supporting layer composed mainly of at least one element selected from the group consisting of Pb, Bi, In, Tl, As, Zn, Ir, Fe, Ru, Os, Mn, Re, V, Ta, Zr, Hf, Sc, Y, and lanthanoid elements, on at least one side thereof.

(6) An information recording medium as defined in (5) above, wherein the supporting layer contains at least Pb or Bi.

(7) An information recording medium as defined in (5) or (6) above, wherein the supporting layer contains at least one additional element selected from the group consisting of Te, Se, and S, in the form of a mixture containing 1-10 atom % of said element.

(8) An information recording medium as defined in (7) above, wherein the supporting layer contains at least Te as the additional element.

(9) An information recording medium as defined in (1) to (8) above, wherein the supporting layer is formed on that side of the recording layer which is adjacent to the substrate.

The supporting layer mentioned in (1) or (5) above may be composed of the specified element alone or composed of a mixture composed of the specified element and 1-10 atom % of additional elements.

In the case where the supporting layer is composed mainly of Se and S, it is desirable to add additional elements such as Te, Pb, and Bi specified in (3) above. These additional elements stabilize the supporting layer and extend the life of the supporting layer. A preferred example of the additional element is Te, which is added in the form of mixture. Se, S, and Te are all chalcogen elements, and they form an all-proportional solid solution. The incorporation with Te increases the viscosity of the molten recording film, with the result that the pits formed have a small rim inner diameter.

Preferred examples of the additional element (other than Te) include Sb, Bi, Sm, Pb, Zn, Si, and Ge. Sb and Bi are desirable because of their ability to improve the environmental resistance of the supporting layer. Sn, Pb, and Zn are desirable because of their ability to increase the chemical stability of the supporting layer. Si and Ge are desirable because of their ability to extend the life of the recording pits.

In the case where the supporting layer is composed mainly of Pb, Bi, etc. mentioned in (5) above, it is desirable to add additional elements such as Te and Se specified in (7) above. These additional elements stabilize the oxidation resistance of the supporing layer and extends the life of the supporting layer. A preferred example of the additional element is Se, which is added in the form of mixture.

Preferable among the components of the supporting layer mentioned in (5) above are Pb and Bi. When Pb fuses into the recording film, the molten recording film increases in viscosity. In this state, there is a sharp temperature distribution in the irradiated part and hence the pits formed have a small rim inner diameter. Likewise, Bi easily diffuses into the recording film to increase the viscosity of the molten recording film, and hence the pits formed have a small rim inner diameter.

According to the present invention, the supporting layer should be formed adjacently to at least one side of the recording film, preferably to that side of the recording film which is adjacent to the substrate. In this case the power margin is larger at the time of recording than in the case where the supporting layer is formed on the opposite side. In the case where the supporting layers are formed on both sides of the recording film, they may be made from the same material or different materials.

In the case where the supporting layer is composed mainly of Se etc. mentioned in (1) above, it should have a thickness in the range of 1–200 nm, preferably 2–100 nm, and most desirably 4–50 nm, so that the maximum power margin is obtained.

Furthermore, the object of the present is achieved by an information recording medium defined in the following.

(10) An information recording medium composed of a substrate and at least a recording film formed thereon, said recording film being capable of forming depressions or pits thereon upon irradiation with a recording energy beam, characterized in that the recording film is provided with at least one supporting layer composed mainly of a chalcogenide, on that side of the recording film which is adjacent to the substrate.

(11) An information recording medium as defined in (10) above, wherein the recording film is provided with an additional supporting layer on that side of the recording film which is opposite to the substrate.

(12) An information recording medium as defined in (10) or (11) above, wherein the supporting layer has a melting point which is higher than that of the recording film.

(13) An information recording medium as defined in any of (10) to (12) above, wherein the supporting layer is composed mainly of an Se compound.

(14) An information recording medium as defined in (13) above, wherein the Se compound is one which is composed of Se and any one of Sb, Sn, In, Bi, Ga, Ge, Pb, and Zn.

(15) An information recording medium as defined in any of (10) to (12) above, wherein the supporting layer is composed mainly of an S compound.

(16) An information recording medium as defined in (15) above, wherein the S compound is one which is composed of S and any one of Sb, Sn, In, Bi, Ga, Ge, Pb, and Zn.

(17) An information recording medium as defined in any of (1) to (16) above, wherein the recording film contains at least Te in the form of mixture.

The information recording medium of the present invention has a supporting layer composed mainly of a compound of a chalcogen element and a metallic element. The supporting layer is formed adjacently to that side of recording film which is closer to the substrate. The supporting layer causes the recording film to form pits with a small rim inner diameter upon irradiation with a recording energy beam. In the case where the information recording medium has an underlayer, the supporting layer is formed between the underlayer and the recording film. An additional supporting layer may be formed on that side of the recording film which is opposite to the substrate. These supporting layers may be composed mainly of the same compound or different compounds.

The supporting layer should have a thickness from 1 nm to 200 nm, preferably 2 nm to 100 nm, and most desirably 4 nm to 50 nm, in order that pits with a small rim inner diameter are formed and a large power margin is obtained.

With respect to that aspect of the invention concerning the supporting layer composed mainly of a chalcogenide such as a compound of S, Se or Te with another element, it is desirable that the supporting layer have a melting point which is higher than that of the recording film. In the case where the recording film contains Te as a constituent, the recording film melts at a temperature lower than 450° C., which is the melting point of Te. Therefore, the supporting layer should have a melting point higher than 450° C. (the melting point of Te), preferably higher than 500° C.

The supporting layer should preferably be composed mainly of an Se compound so that it has a good oxidation resistance. On the other hand, the supporting layer should preferably be composed of an Se compound and S compound so that it has a low absorption of the recording light.

Preferred Se compounds include Se-Sb compounds ($Sb_2Se_3$), Se-Sn compounds ($SnSe$ and $SnSe_2$), Se-In compounds ($In_4Se_3$, $InSe$, $In_6Se_7$, $In_5Se_7$, and $In_2Se_3$), Se-Bi compounds ($BiSe$ and $Bi_2Se_3$), Se-Ga compounds ($GaSe$ and $Ga_2Se_3$), Se-Ge compounds ($GeSe$ and $Ge_2Se_3$), Se-Pb compounds ($PbSe$), and Se-Zn compounds ($ZnSe$). They all have a melting point higher than 450° C., which is the melting point of Te. Therefore, they permit a high-density recording.

Among the above-mentioned Se compounds, Se-Sb and Se-Bi compounds are desirable because of their ability to improve the environmental resistance of the supporting layer; Se-Sn, Se-Pb, and Se-Zn compounds are desirable because of their ability to increase the chemical stability of the supporting layer; and Se-In, Se-Ga, and Se-Ge compounds are desirable because of their ability to extend the life of the recording pits.

Preferred S compounds include S-Sb compounds ($Sb_2S_3$), S-Sn compounds ($SnS$, $Sn_2S_3$, and $SnS_2$), S-In compounds ($InS$, $In_4S_5$, $In_3S_4$, and $In_2S_3$), S-Bi compounds ($Bi_2Se_3$), S-Ga compounds ($Ga_2S$, $GaS$, and $Ga_2Se_3$), S-Ge compounds ($GeS$ and $Ge_2S_3$), S-Pb compounds ($PbS$), and S-Zn compounds ($ZnS$). They all have a melting point higher than 450° C., which is the melting point of Te. Therefore, they permit a high-density recording.

Among the above-mentioned S compounds, S-Sb and S-Bi compounds are desirable because of their ability to improve the environmental resistance of the supporting layer; S-Sn, S-Pb, and S-Zn compounds are desirable because of their ability to increase the chemical stability of the supporting layer; and S-In, S-Ga, and S-Ge compounds are desirable because of their ability to extend the life of the recording pits.

In the case where the Se compound is any one of Se-Sn, Se-In, Se-Bi, Se-Ga, and Se-Ge compounds, or the S compound is any one of S-Sn, S-In, S-Ga, and S-Ge compounds, the supporting layer may have two or more kinds of compounds. These compounds may be used in the form of mixture.

The supporting layer may also be composed of, in addition to the above-mentioned compounds, elements constituting the above-mentioned compounds, other chalcogen elements, and metallic elements in mixture. These elements should be added in an amount less than 10 atom %, preferably less than 5 atom %. Particularly, the addition of Se improves the oxidation resistance of the supporting layer without adverse effects on the recording characteristics.

According to the present invention, the recording film in the information recording medium may be made from any material, although inorganic materials are preferable to organic materials. Preferred examples of the inorganic materials include Te-Se compounds, Te-C compounds, Pb-Te-Se compounds, Te-Sb compounds, and other chalcogenides.

According to the present invention, the substrate in the information recording medium may be made of any material used for conventional information recording media. The substrate may be a glass disc or a plastics disc (of acrylic resin or the like) provided with a UV light-cured resin layer in which are formed tracking grooves, or a plastics disc (of polycarbonate, acrylic resin, polyolefin, or the like) having tracking grooves formed by injection molding. The substrate has an underlayer which is made from a solvent-soluble resin (such as nitrocellulose, acetyl cellulose, and copper phthalocyanine) or a sputterable resin (such as fluoroplastics).

Incidentally, the information recording medium of the present invention may be of any form such as disc, tape, and card.

The information recording medium of the present invention functions differently from the conventional one even though they are made of the same material, they have a recording film of the same thickness, and they perform recording by irradiation with an energy beam having the same power. The difference lies in the configuration of pits formed. Both form pits having almost the same rim outer diameter; however, the former forms pits having a narrower rim width and a smaller rim inner diameter. The smaller rim inner diameter is desirable, because the larger is the rim inner diameter, the lower becomes the signal level between pits. (Thus the difference between this signal level and the signal level of pits decreases. In other words, the degree of reproducing signal modulation decreases.) Pits have an increased rim inner diameter and outer diameter when they are formed with an energy beam having an increased power. For this reason, the recording medium of the present invention is capable of making records with an energy beam of higher power than the conventional one. In other words, the former has a greater power margin than the latter.

DESCRIPTION OF THE PREFERRED EMBODIMENTS

The invention will be described in more detail with reference to the following examples.

EXAMPLE 1

An information recording medium was formed in the following manner on a substrate of discoid tempered glass plate (with chemical strengthening), 300 mm in diameter and 1.2 mm thick. First, an underlayer was formed on a nickel stamper by spin coating from a 1.5% solution of nitrocellulose in n-butyl acetate. After drying, the underlayer was coated with a UV light-curable resin. The substrate was pressed against the coating layer of the UV light-curable resin, and the UV-light curable resin was cured by photopolymerization. Thus there was formed a replica substrate provided with a UV light-cured resin layer which has on its surface tracking grooves at 1.6 μm intervals and prepits indicating addresses. Secondly, on the replica substrate was formed a 10-nm thick supporting layer of Se by vapor deposition. Finally, on the supporting layer was formed a 30-nm thick recording film of $Pb_5Te_{80}Se_{15}$ by vapor deposition. The resulting recording medium is designated as disc A.

To make a second recording medium, the above-mentioned replica substrate was provided with a 30-nm thick recording film of $Pb_5Te_{80}Se_{15}$ by vapor deposition and then with a 10-nm thick supporting layer of Se by vapor deposition. The resulting recording medium is designated as disc B.

To make a comparative recording medium of conventional type, the above-mentioned replica substrate was provided with a 30-nm thick recording film of $Pb_5Te_{80}Se_{15}$ by vapor deposition. No supporting layer was formed. The resulting recording medium is designated as disc C.

Figure 1A:
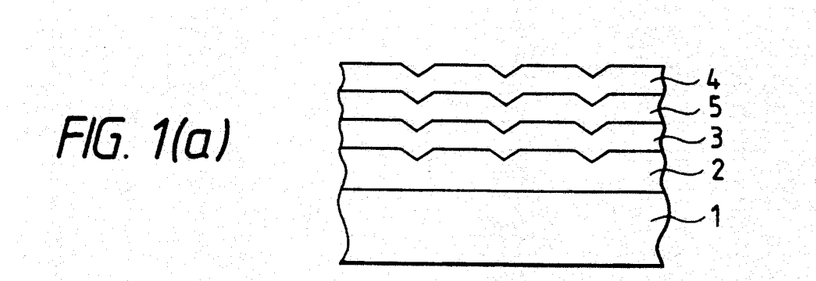
FIGS. 1(a)-1(c) are schematic sectional views showing the structures of the information recording medium of the present invention.
Figure 1B:
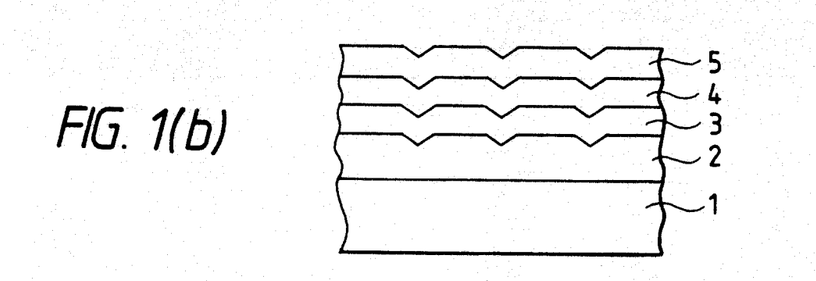
Figure 1C:
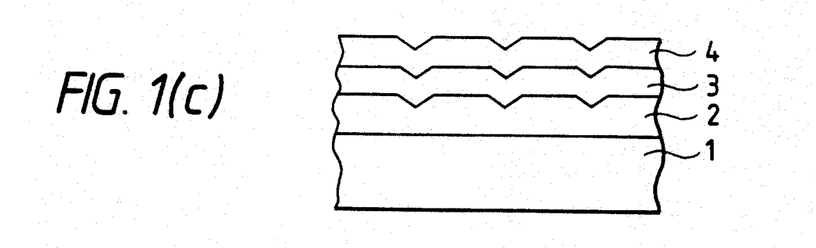

Disc A and disc B (both pertaining to the present invention) and disc C (of conventional type) are schematically shown in section in FIGS. 1(a), 1(b), and 1(c), respectively. Disc A is composed of a substrate 1, a UV light-cured resin layer 2, an underlayer 3, a supporting layer 5, and a recording film 4 laminated one over another, as shown in FIG. 1(a). Disc B is similar to disc A except that the relative position of the recording film 4 and the supporting layer 5 is reversed, as shown in FIG. 1(b). Disc C has no supporting layer as shown in FIG. 1(c).

Figure 2:
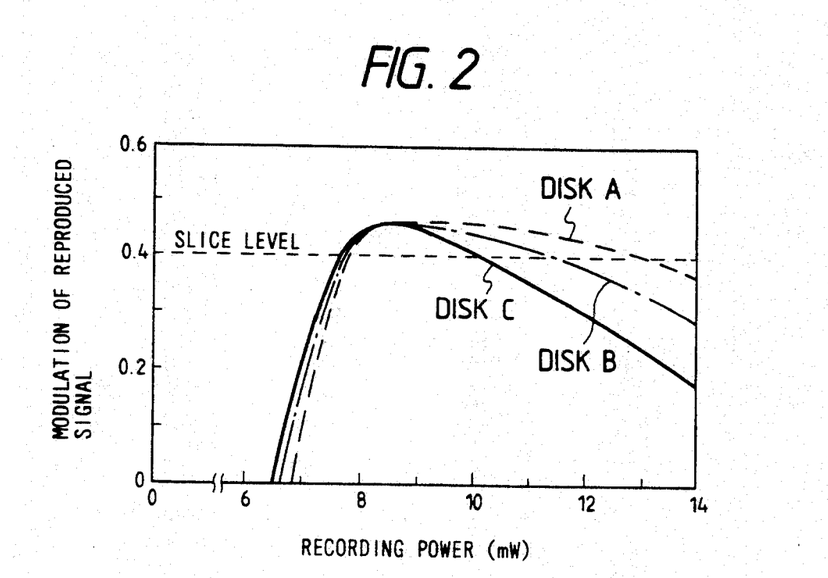
FIG. 2 is a diagram showing the dependence of the degree of modulation of reproduced signals on the recording power, which was measured in an embodiment of the present invention.

These discs A, B, and C were tested for recording and reproducing characteristics in the following manner. Recording was made between tracking grooves by focussing a semiconductor laser light (830 nm wavelength) through an objective lens having a numerical aperture of 0.55, while the disc was turning at 900 rpm. Reading was performed using 1-mW continuous light which does not deform the recording film. Signals of 8.6 MHz were recorded on a track (140 mm radius) with recording pits at intervals of 1.5 μm for high-density recording. The recording pulse width was 45 ns. This recording operation was repeated at different levels of recording power. The recording power vs. the modulation of reproduced signals are shown in FIG. 2. (The latter is defined as the intensity of amplitude of reproduced signals of recording pits divided by the intensity of amplitude of reproduced signals of prepits.) It is noted from FIG. 2 that the three discs vary in the power margin of recording light that gives a modulation of reproduced signals higher than 0.4, with the slice level being 0.4. In the case of disc A, the power margin is 5.1 mW for the recording power in the range of 7.9 to 13 mW. In the case of disc B, the power margin is 3.7 mW for the recording power in the range of 7.8 to 11.5 mW. In the case of disc C, the power margin is 2.3 mW for the recording power in the range of 7.7 to 10 mW. This result indicates that the discs A and B (pertaining to the present invention) have a broader power margin than the disc C (of conventional type).

Figure 3:
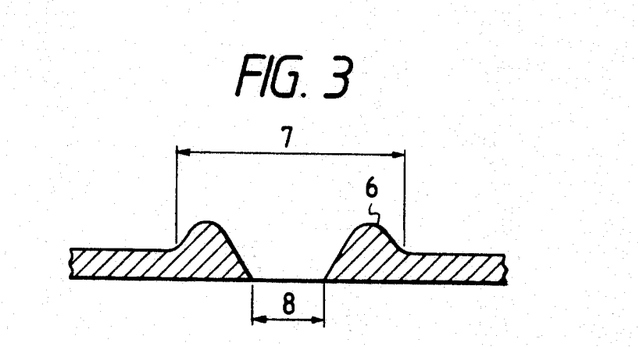
FIG. 3 is a schematic sectional view of a pit formed by the recording process.
Figure 4:
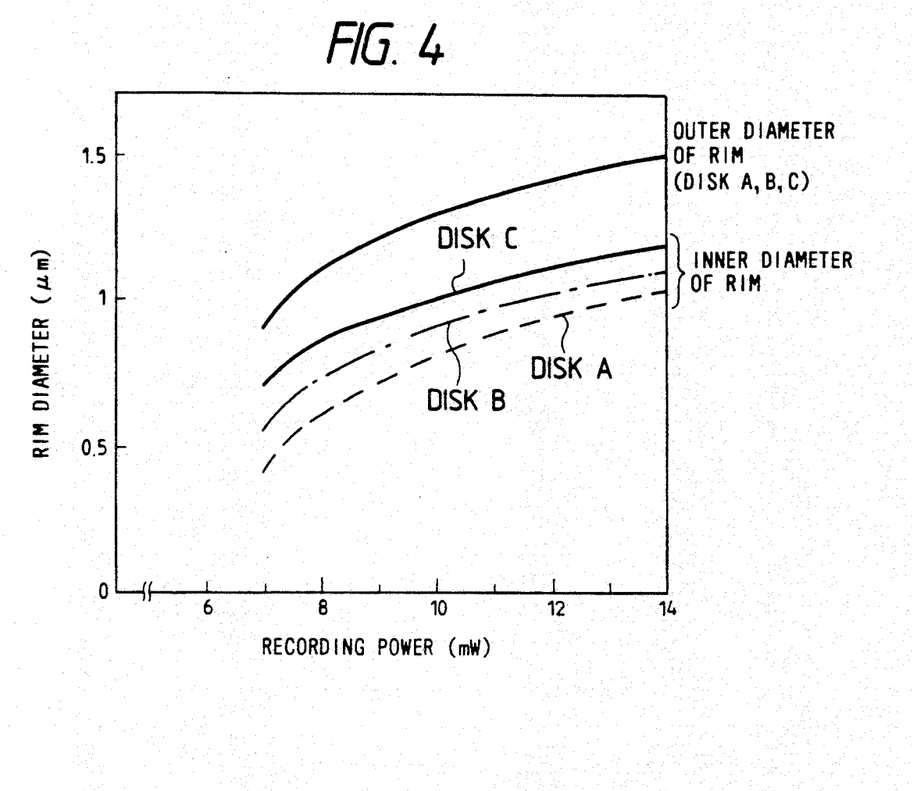
FIG. 4 is a diagram showing the relationship between the recording power and the rim inner diameter and outer diameter of pits formed by the recording process.

The above-mentioned recording process gave rise to a pit which is schematically shown in section in FIG. 3. The pit has a rim inner diameter 8 and rim outer diameter 7 whose measured values are shown in FIG. 4. The rim outer diameter 7 varies depending on the recording power; but all the discs are the same in the relationship between the rim outer diameter and the recording power. The rim inner diameter 8 also varies depending on the recording power; but all the discs are not the same in the relationship between the rim inner diameter and the recording power. At the same recording power, disc A gave the smallest rim inner diameter and disc C gave the largest rim inner diameter, with disc B being intermediate. Incidentally, all the discs A, B, and C were good in S/N ratio and crosstalk.

Figure 5:
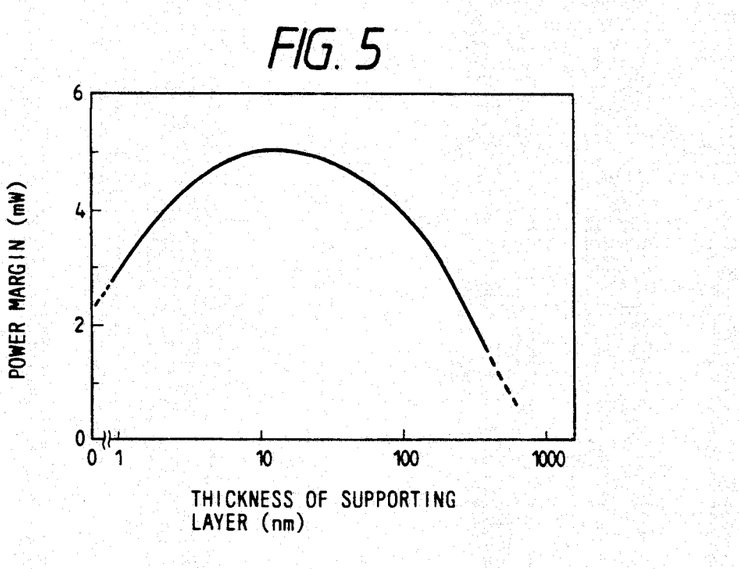
FIG. 5 is a diagram showing the relationship between the power margin and the thickness of the supporting layer.

The same experiment as mentioned above was repeated, with the supporting layer varied in thickness. The relationship between the thickness of the supporting layer and the power margin for modulation of reproduced signals is shown in FIG. 5. It is noted that for a greater power margin, the thickness of the supporting layer should be 1–200 nm, preferably 2–100 nm, and most desirably 4–50 nm.

An information recording medium of the same structure as disc A was prepared, except that the supporting layer (10 nm thick) was made of $Se_{0.8}S_{0.2}$ in place of Se. It was found to have a power margin of 5.0 mW.

EXAMPLE 2

An information recording medium of the same structure as disc A was prepared in the same manner as in Example 1, except that the supporting layer was made of an Se-Te compound incorporated with 1–10 atom % of Te. It was tested for recording and reproducing characteristics. When it comes to power margin, it is almost identical with disc A in Example 1 which has a supporting layer made of Se alone.

It was found that the information recording medium varies in life (at 80° C. and 90% RH) depending on the content of Te in the supporting layer. The one incorporated with 1 atom % of Te in the supporting layer has about twice the life of the recording medium in Example 1. The one incorporated with 3–10 atom % of Te in the supporting layer has about four times the life of the recording medium in Example 1. These results indicate that the incorporation of Te increases the stability of the recording film.

EXAMPLE 3

The same procedure as in Example 2 was repeated except that Te was replaced by 5 atom % each of Pb, Bi, In, Tl, As, Zn, Ir, Fe, Ru, Os, Mn, Re, V, Ta, Zr, Hf, Sc, Y, Sb, Si, Ge, Sn, Al, Cu, Ag, Au, Ni, Pd, Pt, Co, Rh, Cr, Mo, W, Nb, Ti, and lanthanoid elements. The resulting information recording media were tested for recording and reproducing characteristics. When it comes to power margin, they are almost identical with disc A in Example 1. The results of the life test which was performed in the same manner as in Example 2 indicate that they are about four times more durable than the recording medium in Example 1.

EXAMPLE 4

Figure 6:
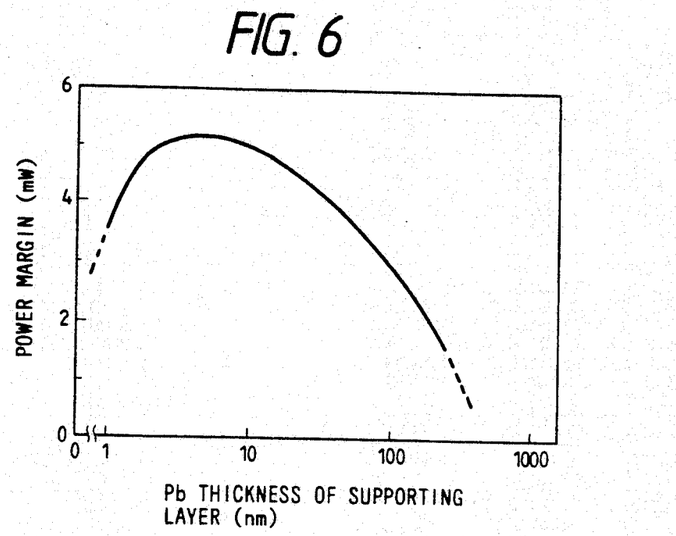
FIG. 6 is a diagram showing the relationship between the power margin and the thickness of a Pb supporting layer.
Figure 7:
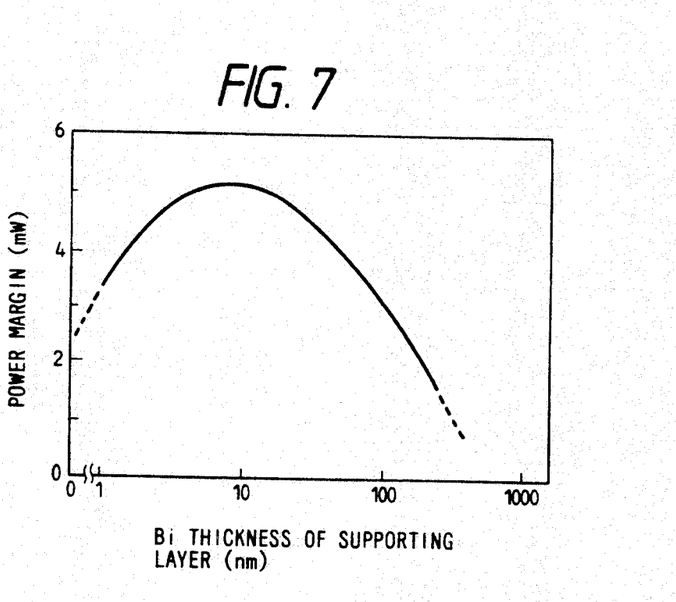
FIG. 7 is a diagram showing the relationship between the power margin and the thickness of a Bi supporting layer.

An information recording medium of the same structure as disc A was prepared in the same manner as in Example 1, except that the supporting layer was made of Pb or Bi. It was tested for recording and reproducing characteristics. The recording medium with a supporting layer made of Pb has the power margin which varies depending on the thickness of the supporting layer as shown in FIG. 6. The recording medium with a supporting layer made of Bi has the power margin which varies depending on the thickness of the supporting layer as shown in FIG. 7. It is noted that both of them have a higher power margin than the conventional recording medium shown in Example 1.

Information recording media were prepared in the same manner as mentioned above, except that Pb or Bi was replaced by any one of the elements shown in Table 1. They were tested for recording and reproducing characteristics. The thickness of the supporting layer and the power margin are shown in Table 1. They all gave a high power margin. They were also good in S/N ratio and crosstalk.

TABLE 1

| Element | Thickness (nm) | Power margin (mW) |
|---|---|---|
| In | 10 | 4.8 |
| Tl | 10 | 4.5 |
| As | 12 | 4.8 |
| Zn | 10 | 4.8 |
| Ir | 7 | 4.5 |
| Fe | 8 | 4.5 |
| Ru | 7 | 4.5 |
| Os | 7 | 4.5 |
| Mn | 10 | 4.5 |
| Re | 7 | 4.5 |
| V | 8 | 4.5 |
| Ta | 8 | 4.5 |
| Zr | 8 | 4.3 |
| Hf | 8 | 4.3 |
| Sc | 8 | 4.3 |
| Y | 8 | 4.3 |
| La | 8 | 4.3 |
| Ce | 8 | 4.3 |
| Pr | 8 | 4.3 |
| Nd | 8 | 4.3 |
| Sm | 8 | 4.3 |
| $Pb_{0.5}Bi_{0.5}$ | 8 | 5.0 |

EXAMPLE 5

Information recording media of the same structure as disc A were prepared in which the supporting layer was made of Pb or Bi incorporated with 1-10 atom % of Se, S, or Te. They were tested for recording and reproducing characteristics. As far as power margin is concerned, they were almost identical with those in Example 4 in which the supporting layer is made of Pb or Bi alone. The results of the life test carried out in the same manner as in Example 2 indicate that the recording media in which the supporting layer is incorporated with 1 atom % of the chalcogen element is about twice as durable as the one in which the supporting layer is made of Pb or Bi alone, and that the recording media in which the supporting layer is incorporated with 3-10 atom % of the chalcogen element is about three times as durable as the one in which the supporting layer is made of Pb or Bi alone.

Moreover, information recording media were prepared in which the supporting layer is made of any one of the elements listed in Table 1 incorporated with 5 atom % of Se or Te. As compared with the recording medium in which the supporting layer contains neither Se nor Te, they have an equal power margin and an approximately three times longer life.

EXAMPLE 6

Figure 8A:
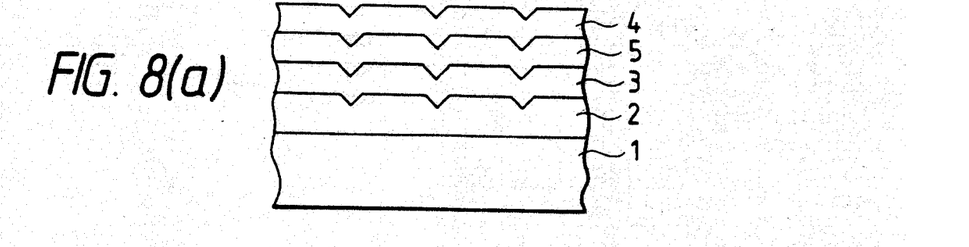
FIGS. 8(a) and (b) are schematic sectional views showing the structure of the information recording medium pertaining to an embodiment of the present invention.

An information recording medium (designated as disc D) was prepared by providing the replica substrate (as mentioned above) with a 10-nm, thick supporting layer 5 of $Sb_2Se_3$ (having a melting of 590° C.) and a 30-nm thick recording film 4 of $Pb_5Te_{80}Se_{15}$ (having a melting point of 430° C.), both by electroheated vapor deposition. Disc D is schematically shown in section in FIG. 8(a).

Figure 8B:
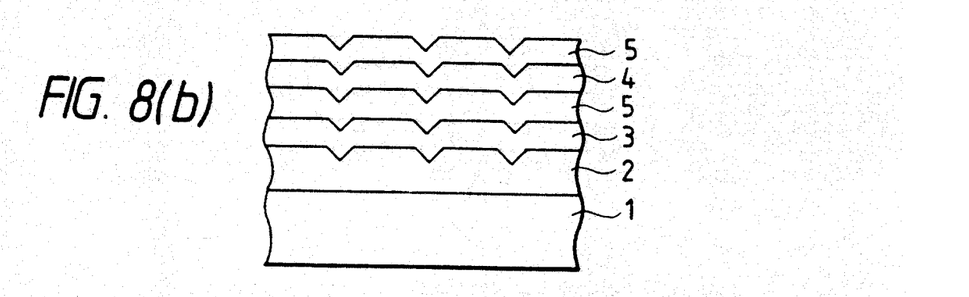

In the same manner as above, an information recording medium (designated as disc E) was prepared by providing the replica substrate (as mentioned above) with a 10-nm thick supporting layer 5 of $Sb_2Se_3$, a 30-nm thick recording film 4 of $Pb_5Te_{80}Se_{15}$, and a 10-nm thick supporting layer 5 of $Sb_2Se_3$ consecutively. Disc E is schematically shown in section in FIG. 8(b).

For comparison, an information recording medium of conventional type (the same structure as disc C) was prepared which has a 30-nm thick recording film of $Pb_5Te_{80}Se_{15}$ but has no supporting layer. Disc C is schematically shown in section in FIG. 1(c).

Figure 9:
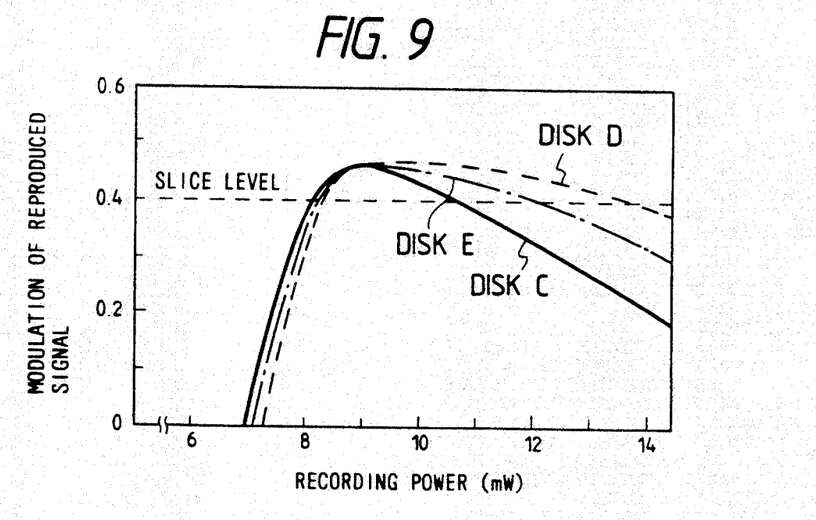
FIG. 9 is a diagram showing the relationship between the recording power and the degree of modulation of reproduced signals, which was observed in an embodiment of the present invention.

The thus obtained discs D, E, and C were tested for recording and reproducing characteristics in the following manner. Recording was made between tracking grooves by focussing a semiconductor laser light (830 nm wavelength) through an objective lens having a numerical aperture of 0.53, while the disc was turning at 900 rpm. Reading was performed using 1-mW continuous light which does not deform the recording film. Signals of 9.4 MHz were recorded on an outer track (140 mm radius) with recording pits at intervals of 1.4 μm for high-density recording. The recording pulse width was 42 ns. This recording operation was repeated at different levels of recording power. The recording power vs. the modulation of reproduced signals are shown in FIG. 9. (The latter is defined as the intensity of amplitude of reproduced signals of recording pits divided by the intensity of amplitude of reproduced signals of prepits.) It is noted from FIG. 9 that the three discs vary in the power margin of recording light that gives a modulation of reproduced signals higher than 0.4, with the slice level being 0.4. In the case of disc D, the power margin is 5.2 mW for the recording power in the range of 8.4 to 13.6 mW. In the case of disc E, the power margin is 3.7 mW for the recording power in the range of 8.3 to 12.0 mW. In the case of disc C, the power margin is 2.4 mW for the recording power in the range of 8.2 to 10.6 mW. This result indicates that the discs D and E (pertaining to the present invention) have a broader power margin (at the time of high-density recording) than the disc C (of conventional type). As far as the disc structure is concerned, disc D is preferable to disc E.

Figure 10:
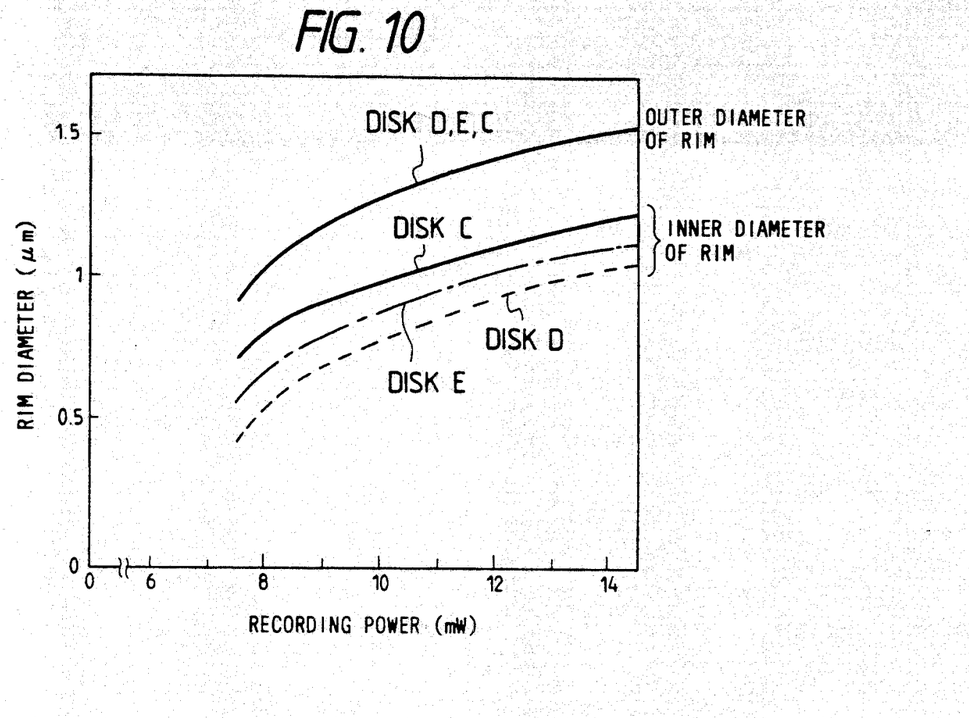
FIG. 10 is a diagram showing the relationship between the recording power and the rim inner diameter and outer diameter of the information recording medium pertaining to the present invention.

The above-mentioned recording process gave rise to a pit which is schematically shown in section in FIG. 3. The rim inner diameter and outer diameter vary depending on the recording power, as shown in FIG. 10. It is noted that all the discs D, E, and C are the same in the relationship between the rim outer diameter and the recording power, but disc D gave the smallest rim inner diameter and disc C gave the largest rim inner diameter, with disc E being intermediate.

Figure 11:
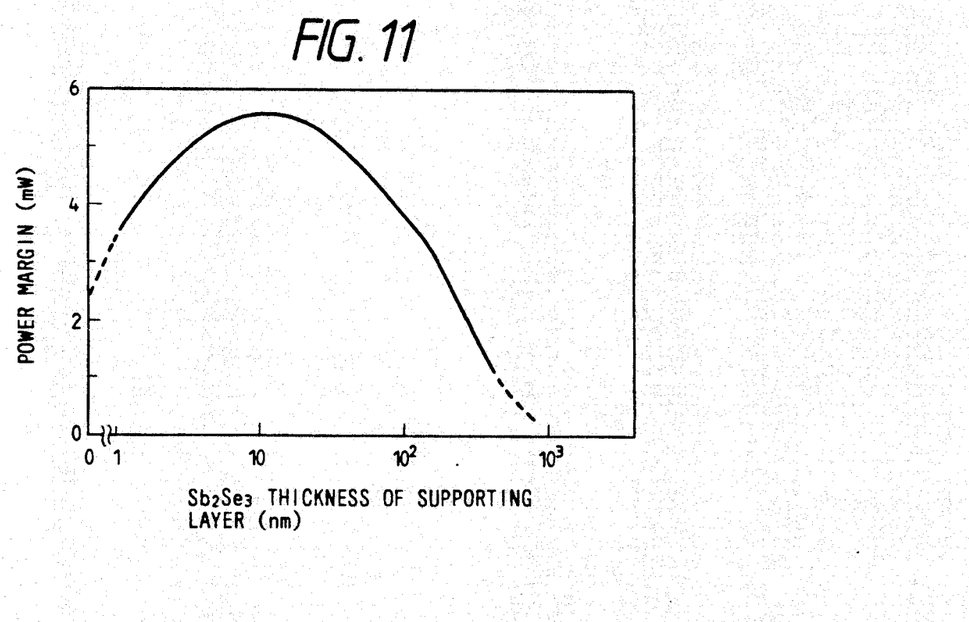
FIG. 11 is a diagram showing the relationship between the power margin and the thickness of an $Sb_2Se_3$ supporting layer in disc A pertaining to an embodiment of the present invention.

The same experiment as mentioned above was repeated, with the supporting layer of $Sb_2Se_3$ varied in thickness. The relationship between the thickness of the supporting layer and the power margin (the range of recording power required for the modulation of reproduced signals to be higher than 0.4 when the slice level is 0.4 at the time of high-density recording) is shown in FIG. 11.

The same experiment as mentioned above was repeated, except that the supporting layer was made of an Se-containing binary compound (PbSe or ZnSe) in place of $Sb_2Se_3$. The results are shown in Table 2.

Moreover, the same experiment as mentioned above was repeated, except that the supporting layer was made of an S-containing binary compound ($Bi_2S_3$, PbS or ZnS) in place of $Sb_2Se_3$. The results are shown in Table 3.

TABLE 2

| Compound | Thickness (nm) | Power margin (mW) |
|---|---|---|
| PbSe | 10 | 5.3 |

TABLE 2-continued

| Compound | Thickness (nm) | Power margin (mW) |
|---|---|---|
| ZnSe | 10 | 5.3 |

TABLE 3

| Compound | Thickness (nm) | Power margin (mW) |
|---|---|---|
| $Bi_2S_3$ | 10 | 5.0 |
| PbS | 10 | 5.0 |
| ZnS | 10 | 5.0 |

The same procedure as in the above-mentioned examples was repeated except that supporting layer was incorporated with 5 atom % of Se. The resulting recording media gave a slightly lower power margin than those in the above-mentioned examples did; however, they showed improved environmental resistance, with a life longer than double at 80° C. and 90% RH.

The same experiments as mentioned above were repeated except that the glass substrate was replaced by a plastics substrate (such as polycarbonate, PMMA, and polyolefin), or the nitrocellulose underlayer was replaced by acetyl cellulose, phthalocyanine dye, guanine, fluoroplastics, polyamide, or polyimide, or the Pb-Te-Se recording film was replaced by a recording film made of a chalcogenide compound such as Te-C, Te-Sb, and Te-0. They gave the same results as mentioned above.

EXAMPLE 7

Figure 12:
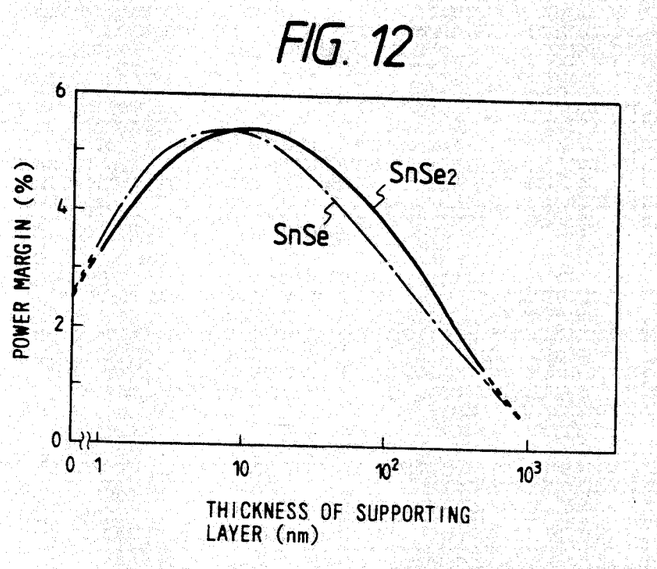
FIG. 12 is a diagram showing the relationship between the power margin and the thickness of an SnSe supporting layer and an $SnSe_2$ supporting layer in disc A pertaining to an embodiment of the present invention.

A disc (of the structure of disc D) was prepared in the same manner as in Example 6 which has a supporting layer made of a binary compound containing Se or S. The disc was tested for recording and reproducing characteristics in the same manner as in Example 6. The relationship between the thickness of the supporting layer and the power margin (the range of recording power required for the modulation of reproduced signals to be higher than 0.4 when the slice level is 0.4) is shown in FIG. 12. In this case, the supporting layer is made of SnSe or $SnSe_2$ which is the Sn-Se compound.

Figure 13:
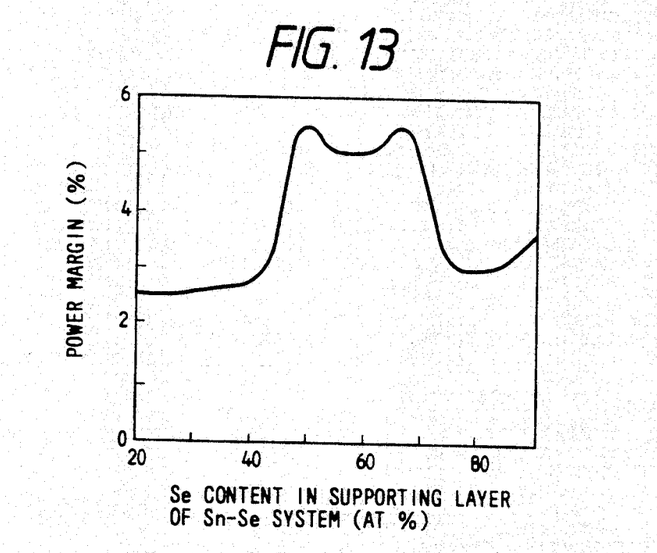
FIG. 13 is a diagram showing the relationship between the power margin and the Se content in the supporting layer of Sn-Se compound in disc A pertaining to an embodiment of the present invention.

The disc in this example gave the power margin which varies with the content of Se in the supporting layer (10 nm thick) made of SnSe and $SnSe_2$ in various ratios, as shown in FIG. 13. The horizontal axis in FIG. 13 represents the content of Se in the composition. It is noted that when the content of Se is 45–72 atom %, the power margin is higher than 4 mW. It is also noted that when the supporting layer is made of SnSe alone or $SnSe_2$ alone or a mixture thereof, the power margin is higher than 5 mW.

The same experiment as mentioned above was repeated, except that the supporting layer was made of an Se-containing binary compound (In-Se, Bi-Se, Ga-Se, or Ge-Se) or a mixture of these compounds in place of Sn-Se. The results are shown in Table 4. The resulting discs gave a power margin higher than 5 mW.

Moreover, the same experiment as mentioned above was repeated, except that the supporting layer was made of an S-containing binary compound (Sn-S, In-S, Ga-S, or Ge-S) or a mixture of these compounds in place of Sn-Se. The results are shown in Table 5. The resulting discs gave a power margin higher than 5 mW.

TABLE 4

| Compound | Thickness (nm) | Power margin (mW) |
|---|---|---|
| $In_4Se_3$ | 10 | 5.3 |
| $In_4Se_3.InSe$ | 10 | 5.2 |
| InSe | 10 | 5.3 |
| $InSe.In_6Se_7$ | 12 | 5.2 |
| $In_6Se_7$ | 12 | 5.4 |
| $In_6Se_7.In_5Se_7$ | 12 | 5.3 |
| $In_5Se_7$ | 12 | 5.5 |
| $In_5Se_7.In_2Se_3$ | 12 | 5.3 |
| $In_2Se_3$ | 12 | 5.5 |
| BiSe | 10 | 5.3 |
| $BiSe.Bi_2Se_3$ | 12 | 5.0 |
| $Bi_2Se_3$ | 12 | 5.5 |
| GaSe | 10 | 5.3 |
| $GaSe.Ga_2Se_3$ | 12 | 5.1 |
| $Ga_2Se_3$ | 12 | 5.5 |
| GeSe | 10 | 5.4 |
| $GeSe.Ge_2Se_3$ | 12 | 5.1 |
| $Ge_2Se_3$ | 12 | 5.5 |

TABLE 5

| Compound | Thickness (nm) | Power margin (mW) |
|---|---|---|
| SnS | 10 | 5.2 |
| $SnS.Sn_2S_3$ | 10 | 5.0 |
| $Sn_2S_3$ | 12 | 5.3 |
| $Sn_2S_3.SnS_2$ | 12 | 5.1 |
| $SnS_2$ | 12 | 5.4 |
| InS | 10 | 5.2 |
| $InS.In_4S_5$ | 12 | 5.0 |
| $In_4S_5$ | 12 | 5.3 |
| $In_4S_5.In_3S_4$ | 12 | 5.2 |
| $In_3S_4$ | 12 | 5.4 |
| $In_3S_4.In_2S_3$ | 12 | 5.3 |
| $In_2S_3$ | 12 | 5.5 |
| $Ga_2S$ | 8 | 5.1 |
| $Ga_2S.GaS$ | 8 | 5.0 |
| GaS | 10 | 5.2 |
| $GaS.Ga_2S_3$ | 12 | 5.0 |
| $Ga_2S_3$ | 12 | 5.4 |
| GeS | 10 | 5.3 |
| $GeS.Ge_2S_3$ | 12 | 5.2 |
| $Ge_2S_3$ | 12 | 5.5 |
| $Sb_2S_3$ | 10 | 5.2 |

The same procedure as in the above-mentioned examples was repeated except that the supporting layer was incorporated with 5 atom % of Se. The resulting recording media gave a slightly lower power margin than those in the above-mentioned examples did; however, they showed improved environmental resistance, with a life longer than double at 80° C. and 90% RH.

The same experiments as mentioned above were repeated except that the glass substrate was replaced by a plastics substrate (such as polycarbonate, PMMA, and polyolefin), or the nitrocellulose underlayer was replaced by acetyl cellulose, phthalocyanine dye, guanine, fluoroplastics, polyamide, or polyimide, or the Pb-Te-Se recording film was replaced by a recording film made of a chalcogenide compound such as Te-C, Te-Sb, and Te-O. They gave the same results as mentioned above.

As mentioned above, the information recording medium of the present invention gives recording pits having a smaller rim inner diameter, so that it achieves a high recording power margin for high-density recording.

What is claimed is:

1. An information recording medium comprised of a substrate and at least a recording film formed thereon, said recording film being capable of forming depressions or pits thereon upon irradiation with a recording energy beam, characterized in that the recording film comprises a Te-Se compound, a Te-C compound, a Pb-Te-Se compound or a Te-Sb compound and is provided with at least one supporting layer comprised mainly of a compound of Se with Sb on that side of the recording film which is adjacent to the substrate.

2. An information recording medium as defined in claim 1, wherein the supporting layer has thickness of from 4 nm to 12 nm.

3. An information recording medium comprised of a substrate and at least a recording film formed thereon, said recording film being capable of forming depressions or pits thereon upon irradiation with a recording energy beam, characterized in that the recording film contains at least Te and is provided with at least one supporting layer comprised mainly of a compound of Se with Sb, on that side of the recording film which is adjacent to the substrate; the supporting layer having a thickness of from 4 nm to 12 nm.

* * * * *